US012015203B2

(12) United States Patent
Kim et al.

(10) Patent No.: US 12,015,203 B2
(45) Date of Patent: Jun. 18, 2024

(54) TRANSPARENT STEALTH STRUCTURE

(71) Applicant: CENTER FOR ADVANCED META-MATERIALS, Daejeon (KR)

(72) Inventors: Yong June Kim, Daejeon (KR); Hyun June Jung, Daejeon (KR); Se Jeong Won, Daejeon (KR); Hak Joo Lee, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 273 days.

(21) Appl. No.: 17/621,225

(22) PCT Filed: Jul. 23, 2019

(86) PCT No.: PCT/KR2019/009097
§ 371 (c)(1),
(2) Date: Dec. 20, 2021

(87) PCT Pub. No.: WO2021/015327
PCT Pub. Date: Jan. 28, 2021

(65) Prior Publication Data

US 2022/0352643 A1 Nov. 3, 2022

(30) Foreign Application Priority Data

Jul. 19, 2019 (KR) ........................ 10-2019-0087860

(51) Int. Cl.
*H01Q 17/00* (2006.01)
*H01Q 15/00* (2006.01)

(52) U.S. Cl.
CPC ....... *H01Q 17/001* (2013.01); *H01Q 15/0026* (2013.01); *H01Q 15/0086* (2013.01); *H01Q 17/00* (2013.01)

(58) Field of Classification Search
CPC .. H01Q 17/001; H01Q 17/00; H01Q 15/0086; H01Q 15/0026
(Continued)

(56) References Cited

U.S. PATENT DOCUMENTS 7,522,124 B2 * 4/2009 Smith .................... H01Q 15/02 343/873
2009/0160718 A1 * 6/2009 Yen .................... H01Q 15/0086 343/742
(Continued)

FOREIGN PATENT DOCUMENTS

JP 11-068374 A 3/1999
JP 2001-111291 A 4/2001
(Continued)

OTHER PUBLICATIONS

International Search Report for PCT/KR2019/009097 dated Apr. 17, 2020 from Korean Intellectual Property Office.

*Primary Examiner* — Hai V Tran
(74) *Attorney, Agent, or Firm* — Revolution IP, PLLC

(57) ABSTRACT

A transparent stealth structure includes: a first transparent film structure stacked on a front surface of a transparent base, the first transparent film structure causing energy loss of incident electromagnetic waves having a target frequency to change a phase of transmitted electromagnetic waves propagating toward the transparent base; and a second transparent film structure stacked on a back surface of a transparent base, the second transparent film structure reflecting the transmitted electromagnetic waves having passed through the transparent base while adjusting a phase of reflected waves propagating toward the first transparent film structure, wherein the first transparent film structure includes a first front transparent conductive pattern having a first sheet resistance and a second front transparent conductive pattern filling a region, and the second transparent film
(Continued)

structure includes a first rear transparent conductive pattern having a third sheet resistance and a second rear transparent conductive pattern filling a region.

11 Claims, 6 Drawing Sheets

(58) Field of Classification Search
USPC ...................................................... 343/700 R
See application file for complete search history.

(56) References Cited

U.S. PATENT DOCUMENTS

| | | | | |
|---|---|---|---|---|
| 2010/0053763 | A1* | 3/2010 | Chowdhury | G02F 1/353<br>359/652 |
| 2012/0075692 | A1* | 3/2012 | Baik | H01P 1/2005<br>359/344 |
| 2013/0277579 | A1* | 10/2013 | Sim | H05K 9/0003<br>250/515.1 |

FOREIGN PATENT DOCUMENTS

| | | | |
|---|---|---|---|
| JP | 2002-076671 | A | 3/2002 |
| KR | 10-2012-0072018 | A | 7/2012 |
| KR | 10-1703846 | B1 | 2/2017 |

* cited by examiner

【FIG. 1】
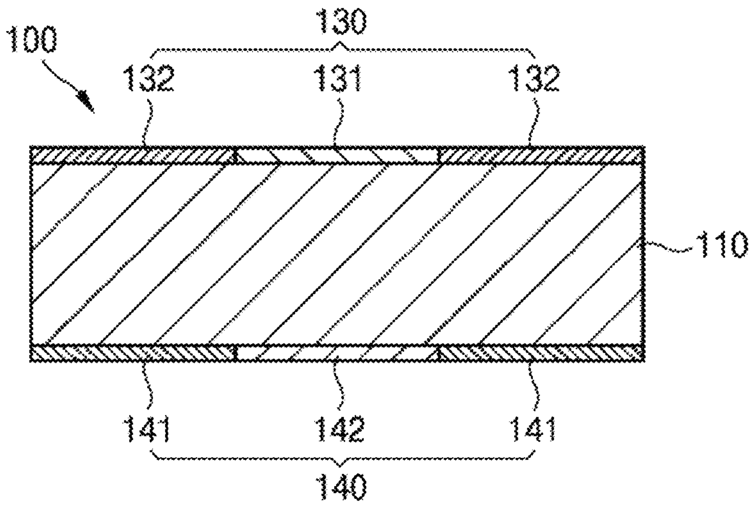
【FIG. 2】
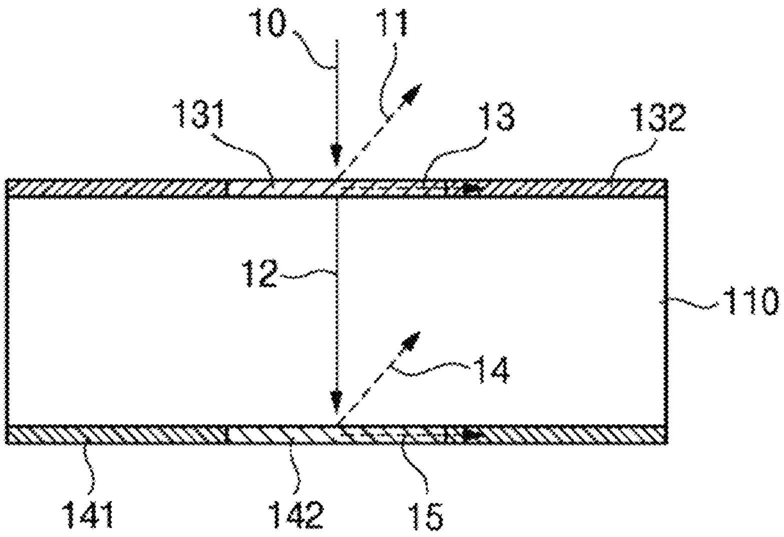

【FIG. 3】
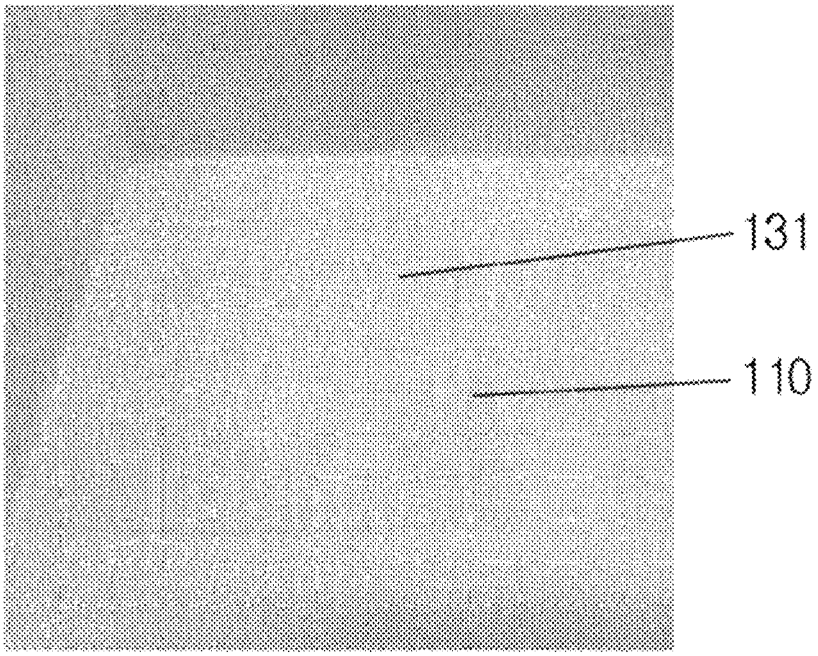
(a)
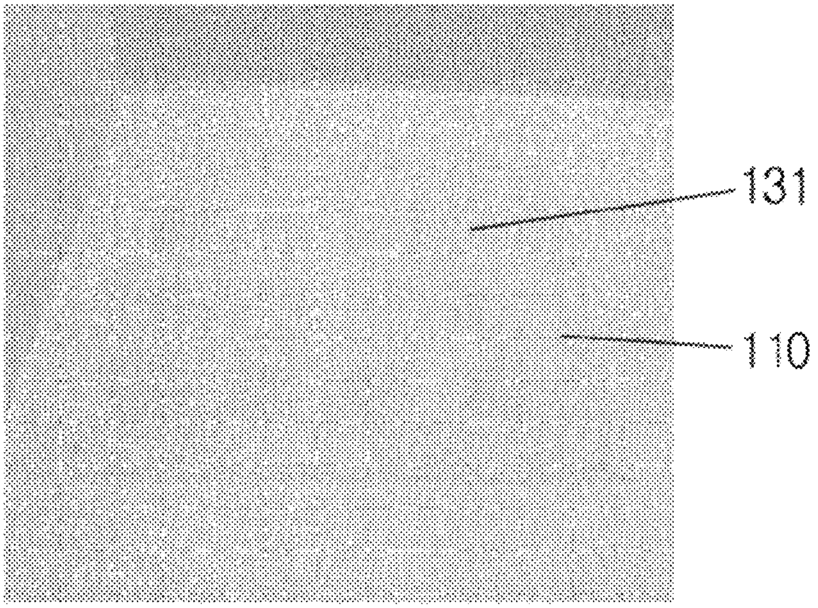
(b)

【FIG. 4】
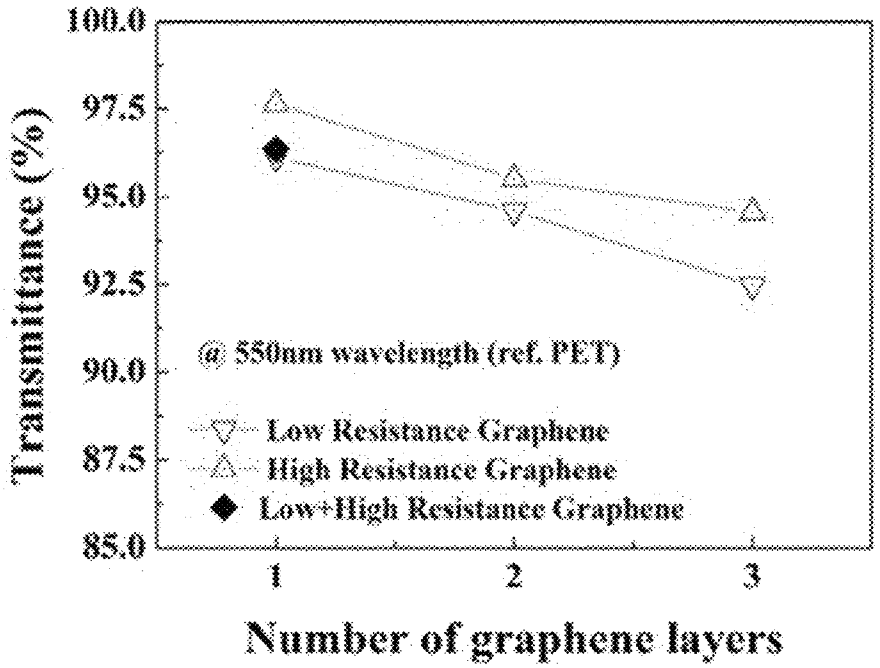
(a)
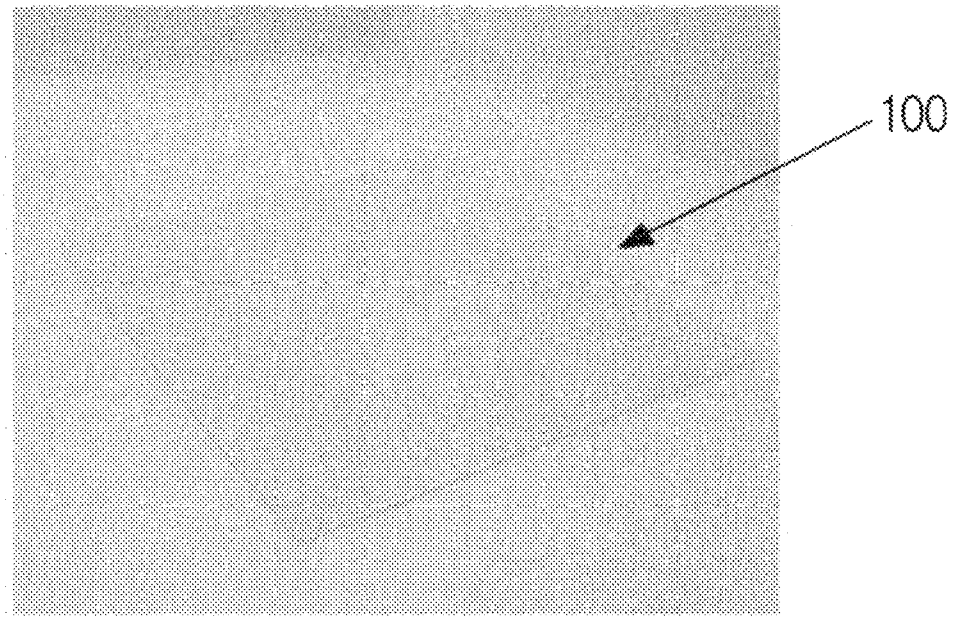
(b)

【FIG. 5】
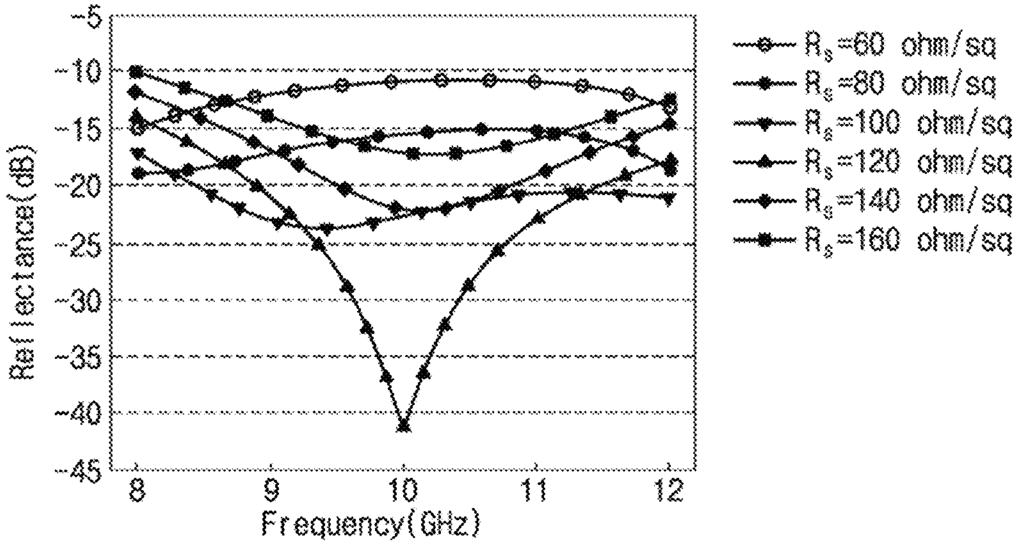
【FIG. 6】
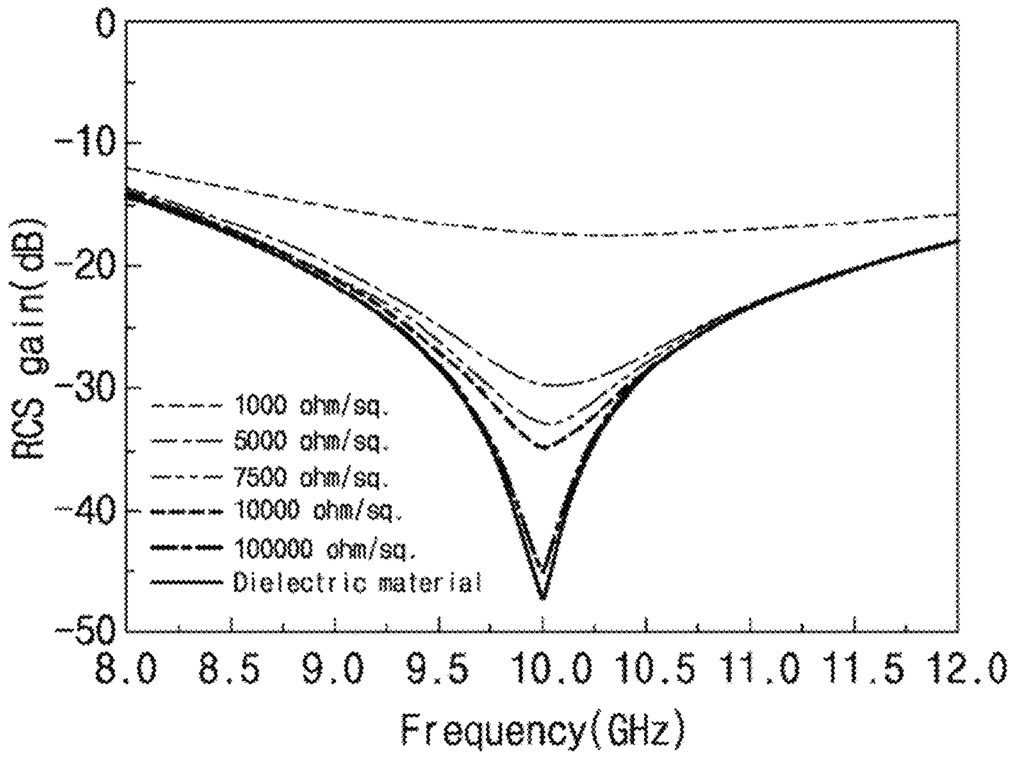

【FIG. 7】
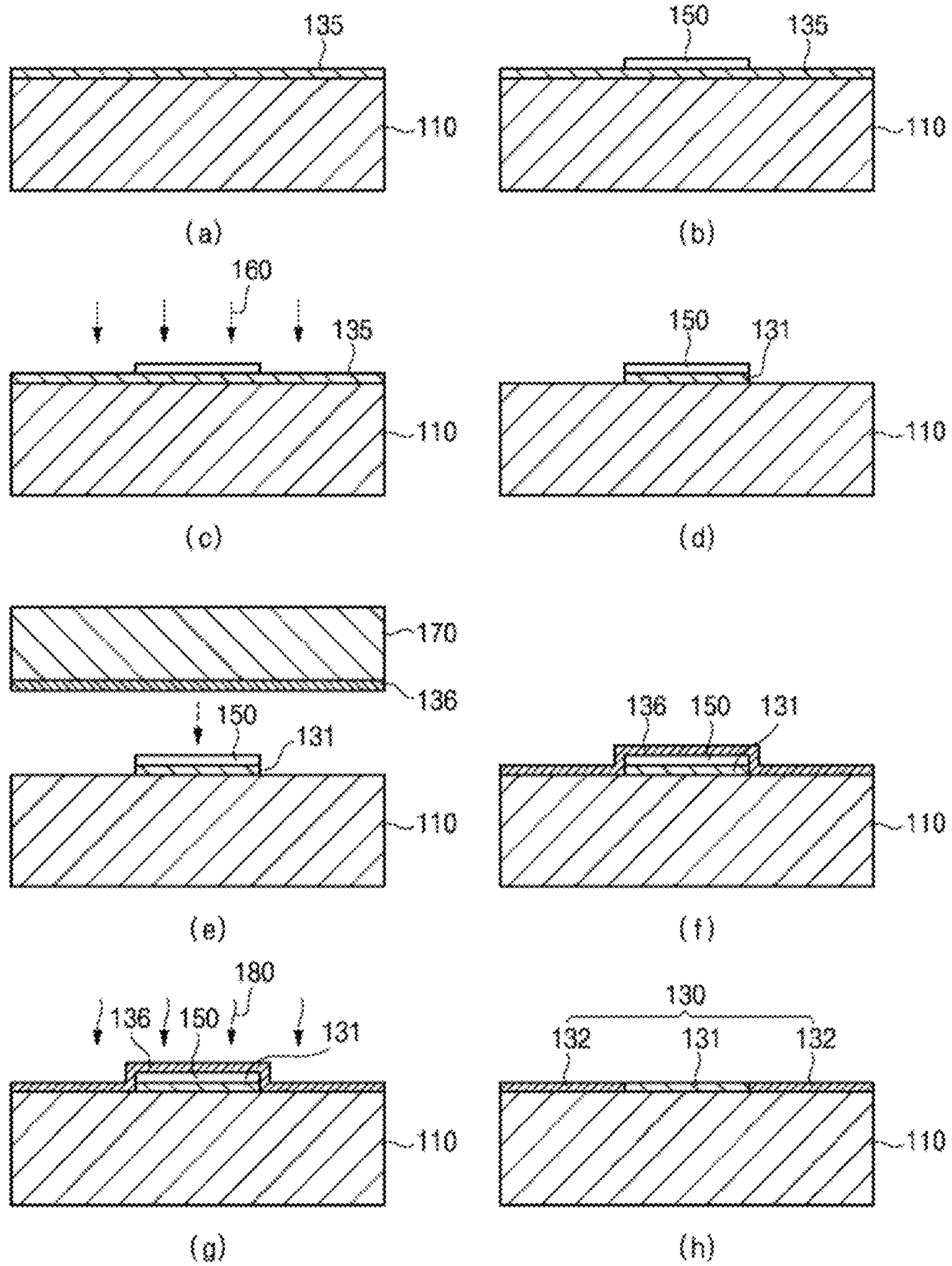

【FIG. 8】
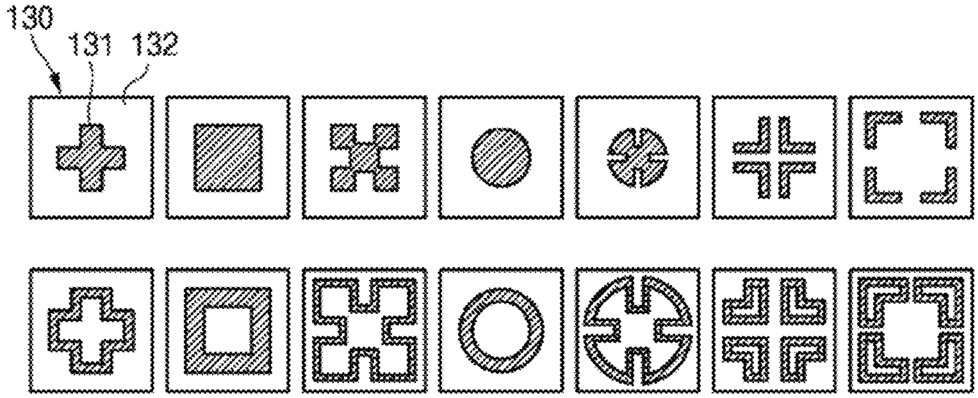
【FIG. 9】
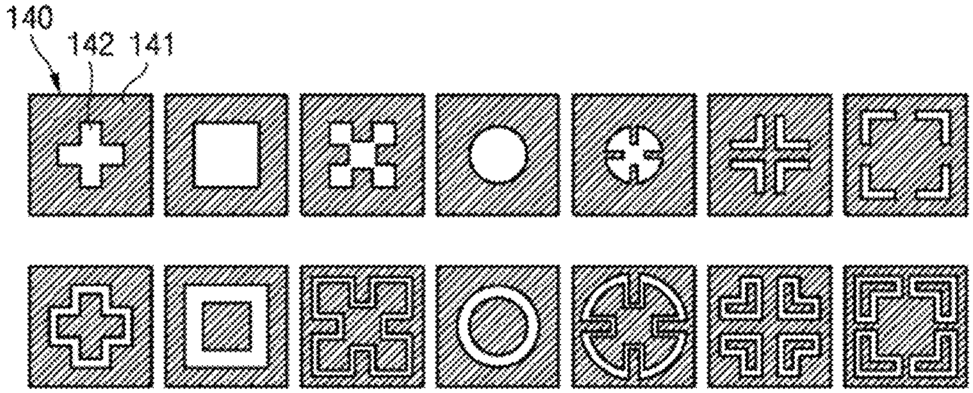

TRANSPARENT STEALTH STRUCTURE

TECHNICAL FIELD

The present invention relates to a transparent stealth structure and, more particularly, to a transparent stealth structure which has improved visibility and high stealth performance.

BACKGROUND ART

Transparent electrodes are used in a broad range of applications, including electrodes for flat panel displays, such as LCDs, PDPs, and OLEDs, amorphous silicon thin film solar cells, and dye-sensitized solar cells.

A representative example of such a transparent electrode film is an indium tin oxide (ITO) film.

Such an ITO transparent electrode is generally deposited on a substrate such as glass and a polymer film. Development of low price, large area, lightweight next-generation displays requires use of a plastic material, which is lighter than glass, as a substrate material. Accordingly, there is a need for a transparent electrode that can exhibit optimal properties when deposited on a plastic substrate.

Applicability of the transparent electrode can be expanded to a stealth film that provides stealth capability by causing energy loss of incident electromagnetic waves, as well as functional glass for IR or EMI shielding.

In particular, in order to apply such a stealth film to a canopy, that is, a transparent cover enclosing the cockpit of an aircraft, or a porthole of a ship, the stealth film needs to have sufficient transmittance and improved visibility without flickering, as well as high stealth performance.

DISCLOSURE

Technical Problem

Embodiments of the present invention are conceived to solve such a problem in the art and provide a transparent stealth structure which has improved visibility and high stealth performance.

It should be understood that aspects of the present invention are not limited to the above. The above and other aspects of the present invention will become apparent to those skilled in the art from the detailed description of the following embodiments in conjunction with the accompanying drawings.

Technical Solution

In accordance with one aspect of the present invention, a transparent stealth structure includes: a first transparent film structure stacked on a front surface of a transparent base, the first transparent film structure causing energy loss of incident electromagnetic waves having a target frequency to change a phase of transmitted electromagnetic waves propagating toward the transparent base; and a second transparent film structure stacked on a back surface of a transparent base, the second transparent film structure reflecting the transmitted electromagnetic waves having passed through the transparent base while adjusting a phase of reflected waves propagating toward the first transparent film structure, wherein the first transparent film structure includes a first front transparent conductive pattern having a first sheet resistance and a second front transparent conductive pattern filling a region without the first front transparent conductive pattern in the first transparent film structure and having a second sheet resistance greater than the first sheet resistance, and the second transparent film structure includes a first rear transparent conductive pattern having a third sheet resistance and a second rear transparent conductive pattern filling a region without the first rear transparent conductive pattern in the second transparent film structure and having a fourth sheet resistance greater than the third sheet resistance.

In one embodiment, the first front transparent conductive pattern and the second front transparent conductive pattern may have the same thickness.

In one embodiment, an allowable range of a difference between a first transmittance of the first front transparent conductive pattern and a second transmittance of the second front transparent conductive pattern may be set such that the first front transparent conductive pattern and the second front transparent conductive pattern are visually indistinguishable from each other.

In one embodiment, the allowable range of the difference between the first transmittance and the second transmittance may be less than 1.7%.

In one embodiment, an allowable range of a ratio of the second sheet resistance to the first sheet resistance may be set such that the second front transparent conductive pattern is prevented from affecting electrical performance of the first front transparent conductive pattern.

In one embodiment, the allowable range of the ratio of the second sheet resistance to the first sheet resistance may be 6.25 or more.

In one embodiment, the first sheet resistance may be greater than 60 ohm/sq and less than 160 ohm/sq.

In one embodiment, the second sheet resistance may be greater than or equal to 1,000 ohm/sq.

In one embodiment, the first front transparent conductive pattern and the second front transparent conductive pattern may be formed of graphene.

In one embodiment, the first sheet resistance may be greater than or equal to the third sheet resistance, and the second sheet resistance may be equal to the fourth sheet resistance.

In one embodiment, the transparent base may be a dielectric base.

Advantageous Effects

With the first front transparent conductive pattern disposed on a transparent base and having a first sheet resistance and the second front transparent conductive pattern disposed in a region without the first front transparent conductive pattern in the same plane on the transparent base and having a second sheet resistance greater than the first sheet resistance, the transparent stealth structure according to the present invention can have improved visibility without flickering caused by the first front transparent conductive pattern and the second front transparent conductive pattern while preventing the second front transparent conductive pattern from affecting electrical performance of the first front transparent conductive pattern.

In addition, with the first transparent film structure formed on the front surface of the transparent base and causing energy loss of incident electromagnetic waves having a target frequency to change a phase of transmitted electromagnetic waves propagating toward the transparent base and the second transparent film structure formed on the back surface of the transparent base and reflecting the transmitted electromagnetic waves having passed through the transparent base while adjusting a phase of reflected waves, the transparent stealth structure according to the present invention can achieve both reduction in thickness of the transparent base and adjustment of resonant frequency without regulation of the thickness of the transparent base while having high stealth performance.

It should be understood that advantageous effects of the present invention are not limited to the above ones, and include any advantageous effects conceivable from the features disclosed in the detailed description of the present invention or the appended claims.

DESCRIPTION OF DRAWINGS

FIG. 1 is a schematic sectional view of a transparent stealth structure according to a first embodiment of the present invention.

FIG. 2 is a schematic view illustrating operation of the transparent stealth structure of FIG. 1.

FIG. 3 shows images illustrating a difference in transmittance between a transparent base and a transparent film structure having a single transparent conductive pattern.

FIG. 4 shows a graph and image illustrating a difference in transmittance between transparent conductive patterns of a first transparent film structure of FIG. 1.

FIG. 5 is a graph illustrating a first sheet resistance of a first front transparent conductive pattern of FIG. 1.

FIG. 6 is a graph illustrating a second sheet resistance of a second front transparent conductive pattern of FIG. 1.

FIG. 7 is a schematic view illustrating a process of fabricating the first transparent film structure of FIG. 1.

FIG. 8 is a view illustrating examples of a pattern of the first transparent film structure of the transparent stealth structure of FIG. 1.

FIG. 9 is a view illustrating examples of a pattern of a second transparent film structure of the transparent stealth structure of FIG. 1.

LIST OF REFERENCE NUMERALS

100: Transparent stealth structure
110: Transparent base
130: First transparent film structure
131: First front transparent conductive pattern
132: Second front transparent conductive pattern
140: Second transparent film structure
141: First rear transparent conductive pattern
142: Second rear transparent conductive pattern

Best Mode

Reference will now be made in detail to various embodiments, examples of which are illustrated in the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

Throughout the specification, when an element or layer is referred to as being "on," "connected to," or "coupled to" another element or layer, it may be directly on, connected to, or coupled to the other element or layer or intervening elements or layers may be present. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, embodiments of the present invention will be described with reference to the accompanying drawings.

FIG. 1 is a sectional view of a transparent stealth structure according to a first embodiment of the present invention, and FIG. 2 is an exemplary view illustrating operation of the transparent stealth structure of FIG. 1.

Referring to FIG. 1 and FIG. 2, the transparent stealth structure 100 may include a transparent base 110, a first transparent film structure 130, and a second transparent film structure 140.

The transparent base 110 may be a target to be protected from detection by radar. For example, the transparent base 110 may include a canopy of a fighter, a porthole of a naval ship, and the like. The transparent base 110 may be a dielectric base.

The first transparent film structure 130 may be stacked on a front surface of the transparent base 110. The first transparent film structure 130 serves to change a phase of transmitted electromagnetic waves 12 propagating toward the transparent base 110 by causing energy loss of incident electromagnetic waves 10 having a target frequency.

The first transparent film structure 130 may have a first front transparent conductive pattern 131 and a second front transparent conductive pattern 132.

The first front transparent conductive pattern 131 may be formed on the transparent base 110. The first front transparent conductive pattern 131 may be formed of graphene, may have a first sheet resistance, and may provide electrical performance.

If only the first front transparent conductive pattern 131 for providing electrical performance is disposed on the transparent base 110, the shape of the first front transparent conductive pattern 131 can be visually distinguished due to differences in transmittance and index of refraction between the transparent base 110 and the first front transparent conductive pattern 131. Visual distinguishability of the first front transparent conductive pattern 131 can cause a flickering effect, thus causing deterioration in visibility.

FIG. 3 shows images illustrating a difference in transmittance between the transparent base and a transparent film structure having a single transparent conductive pattern. FIG. 3(*a*) is an image of the transparent base 110 with the first front transparent conductive pattern 131 formed thereon, wherein the transparent base 110 has a transmittance of 89.8% at a wavelength of 550 nm and the first front transparent conductive pattern 131 has a transmittance of 87.9% at a wavelength of 550 nm, and FIG. 3(*b*) is an image of the transparent base 110 with the first front transparent conductive pattern 131 formed thereon, wherein the transparent base 110 has a transmittance of 90% at a wavelength of 550 nm and the first front transparent conductive pattern 131 has a transmittance of 87.9% at a wavelength of 550 nm.

When a transmittance difference between the transparent base 110 and the first front transparent conductive pattern 131 is 1.9%, as shown in FIG. 3(*a*), the first front transparent conductive pattern 131 is visually distinguishable. When a transmittance difference between the transparent base 110 and the first front transparent conductive pattern 131 is increased to 2.1%, as shown in FIG. 3(*b*), the first front transparent conductive pattern 131 is visually more distinguishable.

In order to overcome such a problem, in the present invention, the second front transparent conductive pattern 132 is formed on the transparent base 110. Specifically, the second front transparent conductive pattern 132 may be disposed in a region without the first front transparent conductive pattern 131 in the same plane on the transparent base 110.

In this embodiment, the first front transparent conductive pattern 131 and the second front transparent conductive pattern 132 may be formed in the same plane on the transparent base 110.

The second front transparent conductive pattern 132 may be formed of graphene.

The first front transparent conductive pattern 131 may have first transmittance and the second front transparent conductive pattern 132 may have second transmittance, wherein an allowable range of a difference between the first transmittance and the second transmittance may be set such that the first front transparent conductive pattern 131 and the second front transparent conductive pattern 132 are visually indistinguishable from each other.

FIG. 4 shows a graph and image illustrating a difference in transmittance between the transparent conductive patterns of the first transparent film structure of FIG. 1.

When the first front transparent conductive pattern 131 having a low resistance and the second front transparent conductive pattern 132 having a high resistance are each formed in single layer and a transmittance difference between the first front transparent conductive pattern 131 (transmittance: 96.13%) and the second front transparent conductive pattern 132 (transmittance: 97.64%) is 1.51%, as shown in FIG. 4(*a*), neither the first front transparent conductive pattern 131 nor the second front transparent conductive pattern 132 causes a flickering effect, thereby improving visibility of the transparent stealth structure 100, as shown in FIG. 4(*b*). In summary, in order to prevent flickering caused by the transparent conductive patterns, it is desirable that an allowable range of the transmittance difference between the first front transparent conductive pattern 131 and the second front transparent conductive pattern 132 be set to less than 1.7%.

In addition, the first front transparent conductive pattern 131 and the second front transparent conductive pattern 132 may have the same thickness to prevent reduction in visibility of the transparent stealth structure.

Further, the second front transparent conductive pattern 132 may have a second sheet resistance greater than the first sheet resistance of the first front transparent conductive pattern 131. In this way, it is possible to prevent the second front transparent conductive pattern 132 from affecting electrical performance of the first front transparent conductive pattern 131.

An allowable range of a ratio of the second sheet resistance to the first sheet resistance may be set such that the second front transparent conductive pattern 132 is prevented from affecting electrical performance of the first front transparent conductive pattern 131.

Preferably, the transparent stealth structure 100 has a reflectance of −10 dB or less at frequencies in the X-band to have stealth capability.

FIG. 5 is a graph illustrating the first sheet resistance of the first front transparent conductive pattern of FIG. 1.

Referring to FIG. 5, when the first sheet resistance of the first front transparent conductive pattern is 60 ohm/sq or less, the first front transparent conductive pattern has a reflectance of greater than −10 dB at a frequency of around 10.6 GHz. In addition, when the first sheet resistance of the first front transparent conductive pattern is 160 ohm/sq or more, the first front transparent conductive pattern has a reflectance of greater than −10 dB at a frequency of around 8 GHz. Accordingly, in order to ensure that the first front transparent conductive pattern has a reflectance of −10 dB or less over the entire X-band, it is desirable that the first sheet resistance be greater than 60 ohm/sq and less than 160 ohm/sq.

FIG. 6 is a graph illustrating the second sheet resistance of the second front transparent conductive pattern of FIG. 1.

Referring to FIG. 6, when the second sheet resistance of the second front transparent conductive pattern 132 is 1,000 ohm/sq or more, the second front transparent conductive pattern 132 has a reflectance of −10 dB or less over the entire X-band and a radar cross section (RCS) of 10% or less.

Accordingly, the allowable range of the ratio of the second sheet resistance to the first sheet resistance may be 6.25 or more. Preferably, the allowable range of the ratio of the second sheet resistance to the first sheet resistance is 6.25 to 16.67.

FIG. 7 is a schematic view illustrating a process of fabricating the first transparent film structure of FIG. 1.

Referring to FIG. 7, a method of fabricating the first transparent film structure may include a first front transparent conductive pattern forming step and a second front transparent conductive pattern forming step.

In the first front transparent conductive pattern forming step, first, a first front transparent conductive layer 135 having the first sheet resistance is formed on the transparent base 110.

Thereafter, a photoresist layer 150 is formed on the first front transparent conductive layer 135. Here, the photoresist layer 150 may be formed on a portion of the first front transparent conductive layer 135, which is intended to form the first front transparent conductive pattern 131.

Thereafter, the other portion of the first front transparent conductive layer 135 without the photoresist layer 150 may be subjected to plasma etching 160 to form the first front transparent conductive pattern 131 corresponding in shape to the photoresist layer 150.

Thereafter, a second front transparent conductive layer 136 having the second sheet resistance is formed on one surface of a carrier film 170, followed by pressing the second front transparent conductive layer 136 against the photoresist layer 150 such that the second front transparent conductive layer 136 is disposed on the transparent base 110 with the first front transparent conductive pattern 131 flanked thereby while the photoresist layer 150 is covered by the second front transparent conductive layer 136.

Thereafter, the carrier film 170 is removed from the second front transparent conductive layer 136, and then the photoresist layer 150 and the second front transparent conductive layer 136 covering the photoresist layer 150 are both removed with a solvent such that the second front transparent conductive layer 136 outside the first front transparent conductive pattern 131 forms the second front transparent conductive pattern 132. Through this process, the first transparent film structure 130 is obtained which includes the first front transparent conductive pattern 131 formed on the transparent base 110 and the second front transparent conductive pattern 131 disposed in a region without the first front transparent conductive pattern 131 in the same plane on the transparent base 110. Ultrasonication may further be performed upon removal of the photoresist layer 150 with the solvent 180 to create a crack on the second front transparent conductive layer 136 covering the photoresist layer 150 such that the solvent 180 can permeate the photoresist layer 150 through the crack.

As described above, it is desirable that the first transparent film structure 130 have high electromagnetic wave absorption performance. To this end, the first front transparent conductive pattern 131 may be formed in an island shape.

FIG. 8 is a view illustrating examples of a pattern of the first transparent film structure of the transparent stealth structure of FIG. 1. Referring to FIG. 8, the first front transparent conductive pattern 131 in the first transparent film structure 130 may have various island shapes.

Referring back to FIG. 1 and FIG. 2, the second transparent film structure 140 may be stacked on the back surface of the transparent base 110. The second transparent film structure 140 serves to reflect the transmitted electromagnetic waves 12 having passed through the transparent base 110 while adjusting a phase of reflected waves 14 propagating toward the first transparent film structure 130.

The second transparent film structure 140 may have a first rear transparent conductive pattern 141 and a second rear transparent conductive pattern 142.

The first rear transparent conductive pattern 141 may have a third sheet resistance.

In addition, the second rear transparent conductive pattern 142 may fill a region without the first rear transparent conductive pattern 141 in the second transparent film structure 140, and may have a fourth sheet resistance greater than the third sheet resistance.

The second transparent film structure 140 may correspond to the first transparent film structure 130. In addition, the second transparent film structure 140 may be fabricated by a method corresponding to the method of fabricating the first transparent film structure 130 as described above.

FIG. 9 is a view illustrating examples of a pattern of the second transparent film structure of the transparent stealth structure of FIG. 1. Referring to FIG. 9, the first rear transparent conductive pattern 141 in the second transparent film structure 140 may have a non-island shape or a slitted shape. In this way, the second transparent film structure 140 may have a transmittance of less than −10 dB, that is, reflect 90% or more of electromagnetic waves incident thereon.

In the transparent stealth structure 100, the first sheet resistance of the first front transparent conductive pattern 131 may be greater than or equal to the third sheet resistance of the first rear transparent conductive pattern 141. In this way, the first front transparent conductive pattern 131 may easily absorb the incident electromagnetic waves 10 and the first rear transparent conductive pattern 141 may easily reflect the transmitted electromagnetic waves 12 having passed through the first transparent film structure 130.

Radar generally uses electromagnetic waves 10 in the X-band. The first transparent film structure 130 may effectively absorb the electromagnetic waves 10.

When the electromagnetic waves 10 strike the first transparent film structure 130, some electromagnetic waves 10 are reflected in the form of a reflected wave 11. Here, the second sheet resistance of the second front transparent conductive pattern 132 is set to 1,000 ohm/sq or more to achieve a reflectance of −10 dB or less over the entire X-band.

The other electromagnetic waves 10 are transmitted to the transparent base 110 through the first transparent film structure 130. When the electromagnetic waves 10 strike the first transparent film structure 130, a magnetic field is generated in the first transparent film structure 130. The generated magnetic field causes generation of induced current due to electromagnetic induction, which leads to heat loss 13 and thus partial absorption of the electromagnetic waves.

The transmitted electromagnetic waves 12 transmitted to the second transparent film structure 140 through the transparent base 110 are reflected in the form of a reflected wave 14 from the second transparent film structure 140, or are absorbed by the second transparent film structure 140 by losing heat 15.

The electromagnetic waves 10 are subjected to primary phase change in the first transparent film structure 130 and secondary phase change in the second transparent film structure 140. Through each of the phase changes, the amplitude of the electromagnetic waves can be maximized to allow maximization of generation of induced current, thereby achieving more effective heat loss and absorption of the electromagnetic waves and high stealth performance. Since the main purpose of the first transparent film structure 130 is to absorb energy of incident electromagnetic waves, there may be a limit in optimizing the phase of transmitted waves. According to the present invention, the phase of reflected waves may be optimally adjusted using the second transparent film structure 140, whereby both reduction in thickness of the transparent base for a given target frequency and adjustment of resonant frequency without regulation in thickness of the transparent base can be achieved while providing high stealth performance.

The second sheet resistance of the second front transparent conductive pattern 132 may be equal to the fourth sheet resistance of the second rear transparent conductive pattern 142.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. For example, components described as implemented separately may also be implemented in combined form, and vice versa.

The scope of the present invention is indicated by the following claims and all changes or modifications derived from the meaning and scope of the claims and equivalents thereto should be construed as being within the scope of the present invention.

The invention claimed is:

1. A transparent stealth structure comprising:

a first transparent film structure stacked on a front surface of a transparent base, the first transparent film structure causing energy loss of incident electromagnetic waves having a target frequency to change a phase of transmitted electromagnetic waves propagating toward the transparent base; and a second transparent film structure stacked on a back surface of the transparent base, the second transparent film structure reflecting the transmitted electromagnetic waves having passed through the transparent base while adjusting a phase of reflected waves propagating toward the first transparent film structure, wherein the first transparent film structure comprises a first front transparent conductive pattern having a first sheet resistance and a second front transparent conductive pattern filling a region without the first front transparent conductive pattern in the first transparent film structure and having a second sheet resistance greater than the first sheet resistance, and the second transparent film structure comprises a first rear transparent conductive pattern having a third sheet resistance and a second rear transparent conductive pattern filling a region without the first rear transparent conductive pattern in the second transparent film structure and having a fourth sheet resistance greater than the third sheet resistance, wherein a bottom surface of the first front transparent conductive pattern and a bottom surface of the second front transparent conductive pattern are in direct contact with the front surface of the transparent base, and a top surface of the first rear transparent conductive pattern and a top surface of the second rear transparent conductive pattern are in direct contact with the back surface the transparent base.

2. The transparent stealth structure according to claim 1, wherein the first front transparent conductive pattern and the second front transparent conductive pattern have the same thickness.

3. The transparent stealth structure according to claim 1, wherein an allowable range of a difference between a first transmittance of the first front transparent conductive pattern and a second transmittance of the second front transparent conductive pattern is set such that the first front transparent conductive pattern and the second front transparent conductive pattern are visually indistinguishable from each other.

4. The transparent stealth structure according to claim 3, wherein the allowable range of the difference between the first transmittance and the second transmittance is less than 1.7%.

5. The transparent stealth structure according to claim 1, wherein an allowable range of a ratio of the second sheet resistance to the first sheet resistance is set such that the second front transparent conductive pattern is prevented from affecting electrical performance of the first front transparent conductive pattern.

6. The transparent stealth structure according to claim 5, wherein the allowable range of the ratio of the second sheet resistance to the first sheet resistance is 6.25 or more.

7. The transparent stealth structure according to claim 5, wherein the first sheet resistance is greater than 60 ohm/sq and less than 160 ohm/sq.

8. The transparent stealth structure according to claim 5, wherein the second sheet resistance is greater than or equal to 1,000 ohm/sq.

9. The transparent stealth structure according to claim 1, wherein the first front transparent conductive pattern and the second front transparent conductive pattern are formed of graphene.

10. The transparent stealth structure according to claim 1, wherein the first sheet resistance is greater than or equal to the third sheet resistance, and the second sheet resistance is equal to the fourth sheet resistance.

11. The transparent stealth structure according to claim 1, wherein the transparent base is a dielectric base.

* * * * *